United States Patent
Kubota et al.

[11] Patent Number: 6,037,037
[45] Date of Patent: Mar. 14, 2000

[54] MAGNETIC RECORDING MEDIUM

[75] Inventors: Kazunori Kubota, Moriguchi; Fumio Echigo, Osaka; Yukihiro Shimasaki, Sanda; Takumi Haneda, Suita; Hirofumi Ito; Tetuo Fuchi, both of Osaka; Kiyoshi Kobata, Takatsuki, all of Japan

[73] Assignee: Matsushita Electric Industrial Co., Ltd., Osaka, Japan

[21] Appl. No.: 09/110,794

[22] Filed: Jul. 6, 1998

[30] Foreign Application Priority Data

Jul. 8, 1997 [JP] Japan ................................. 9-182518

[51] Int. Cl.[7] ........................................................ G11B 5/68
[52] U.S. Cl. ........................... 428/141; 428/323; 428/329; 428/694 BS; 428/900
[58] Field of Search .................................... 428/141, 323, 428/329, 694 BS, 900

[56] References Cited

U.S. PATENT DOCUMENTS

| | | | |
|---|---|---|---|
| 5,612,122 | 3/1997 | Tsukamoto et al. | 428/216 |
| 5,645,917 | 7/1997 | Ejiri et al. | 428/694 |
| 5,756,148 | 5/1998 | Ejiri et al. | 428/694 |
| 5,763,046 | 6/1998 | Ejiri et al. | 428/694 |
| 5,895,707 | 4/1999 | Miura | 428/216 |

FOREIGN PATENT DOCUMENTS 63-191315  8/1988  Japan .

*Primary Examiner*—Stevan A. Resan
*Attorney, Agent, or Firm*—Merchant & Gould P.C.

[57] ABSTRACT

The present invention provides a thin multilayer magnetic recording medium having improved electromagnetic conversion property and durability, comprising coating layers of a lower non-magnetic layer and an upper magnetic layer. The non-magnetic layer of this magnetic recording medium comprises a non-magnetic needle body having an average major axis length of 0.25 to 1.0 $\mu$m and an average minor axis length of 0.005 to 0.0151 $\mu$m, a first binding resin having a glass transition temperature ($Tg_1$) of 30 to 50° C., and fatty acid ester. The content of the first binding resin is 15 to 30 wt % with respect to the non-magnetic needle body. The content of the fatty acid ester is 2 to 15 wt % with respect to the first binding resin. The magnetic layer having a dry thickness of 0.5 $\mu$m or less comprises ferromagnetic powder and a second binding resin having a glass transition temperature ($Tg_2$) of 40 to 70° C. $Tg_1$ is at least 5° C. lower than $Tg_2$, and the entire thickness comprising the layers and the film is 12 $\mu$m or less.

9 Claims, No Drawings

MAGNETIC RECORDING MEDIUM

BACKGROUND OF THE INVENTION

1. Field of the Invention

The present invention relates to a magnetic recording medium. More specifically, the present invention relates to a coating type magnetic recording medium formed by laminating a non-magnetic layer and a magnetic layer.

2. Description of the Prior Art

An evaporated type magnetic recording medium and a coating type magnetic recording medium are conventionally known as a magnetic recording medium such as a video tape. An evaporated type magnetic recording medium refers to a medium formed by evaporating a magnetic metal onto a surface of a non-magnetic support film so as to form an evaporated film thereon. A coating type magnetic recording medium refers to a medium formed by coating a support with a paint in which magnetic powder is dispersed so as to form a coating film and drying the coating film. The evaporated type magnetic film provides the property of high output, resulting from the fact that magnetic metal exists in a magnetic layer in a high density and that a thin magnetic layer can be formed. However, the evaporated type magnetic recording medium is produced through complicated processes such as evaporation of a magnetic metal, resulting in low producibility. Furthermore, since the magnetic layer is a metal film, the evaporated type magnetic recording film is oxidized readily, which constitutes a drawback of poor long-term keeping quality. On the other hand, the coating type magnetic recording medium is hardly oxidized so that it has an excellent long-term keeping quality, because the surface of the magnetic powder is coated with a binding resin. Furthermore, the coating rate can be controlled arbitrarily, so that the coating type magnetic recording medium is excellent in producibility. However, the magnetic layer of the coating type magnetic recording medium is required to be thin to suppress the self-demagnetizing function for the purpose of attaining the high output property. Therefore, the surface roughness of the surface of the non-magnetic support reduces the electromagnetic conversion property, and the thin magnetic layer results in poor durability.

In order to overcome those disadvantages, a two-layer coating type magnetic recording medium has been proposed (e.g. Japanese Laid-Open Patent Publication (Tokkai-Sho) No.63-191315). This film is formed in the following manner: A non-magnetic layer formed of a non-magnetic paint is formed on a surface of a support. A magnetic layer formed of a magnetic paint is formed on the non-magnetic layer. Then, the non-magnetic layer and the magnetic layer are dried simultaneously. This coating type magnetic recording film of two layers substantially prevents the surface roughness of the surface of the support from affecting the surface of the magnetic layer by forming the non-magnetic layer having a large thickness, and improves the electromagnetic conversion property. Furthermore, even if a thin magnetic film is formed to attain the high output property, the strength of the coating films can be kept high by maintaining a high strength in the non-magnetic film. However, during the orientation treatment for such a two-layer magnetic recording medium, the magnetic field rotates a magnetic body and causes turbulence at the interface of the upper and lower layers. Therefore, it is proposed that the lower non-magnetic layer comprises a needle-like inorganic pigment in order to prevent the turbulence at the upper and lower layers due to the oriented magnetic field (Japanese Laid-Open Patent Publication (Tokkai-Hei) No. 7-326037).

In recent years, in order to achieve high transfer rate or high density recording, the relative rate of movement between a tape and a head has become high. Moreover, the rotating rate for a cylinder head has been raised. When a cylinder head is rotated at a higher rate, more air flows into a recess of the head. The flow of the air forces the magnetic recording medium to be in contact with the head more intensely, thus increasing the impact on the tape. On the other hand, a tape has become thinner in response to a demand for small cassette size and high capacity for recording. Accordingly, it is increasingly desired to improve the mechanical strength of a tape, especially the Young's modulus in the forward direction of the tape while maintaining a satisfactory electromagnetic conversion property. The conventional coating type magnetic recording mediums cannot necessarily satisfy those demands.

SUMMARY OF THE INVENTION

Therefore, with the foregoing in mind, it is the object of the present invention to provide a coating type magnetic recording medium having a satisfactory electromagnetic conversion property and excellent mechanical strength such as tape travel characteristics and durability.

In order to achieve the above-described object, the magnetic recording medium of the present invention comprises a non-magnetic film, a non-magnetic layer, and a magnetic layer having a thickness of 0.5 $\mu$m or less when dried. A surface of the non-magnetic film is coated with the non-magnetic layer, and the non-magnetic layer is coated with the magnetic layer. The non-magnetic layer comprises a non-magnetic needle body having an average major axis length of 0.25 to 1.0 $\mu$m and an average minor axis length of 0.005 to 0.015 $\mu$m, a first binding resin having a glass transition temperature ($Tg_1$) of 30 to 50° C., and a fatty acid ester. The content of the first binding resin is 15 to 30 wt % with respect to the non-magnetic needle body. The content of the fatty acid ester is 2 to 15 wt % with respect to the first binding resin. The magnetic layer comprises ferromagnetic powder and a second binding resin having a glass transition temperature ($Tg_2$) of 40 to 70° C. The glass transition temperature ($Tg_1$) of the first binding resin is at least 5° C. lower than the glass transition temperature ($Tg_2$) of the second binding resin. The entire thickness of the layers and the film is 12 $\mu$m or less.

Thus, this embodiment can provide a coating type magnetic recording medium excellent in the electromagnetic conversion property and the mechanical property by not only providing non-magnetic needle bodies in the non-magnetic layer, but also by optimizing the shape of the needle bodies and the amount and the characteristics of other components included in the non-magnetic layer and the magnetic layer.

In the non-magnetic layer, non-magnetic bodies are dispersed in the binding resin and form a network, so that a preferable viscosity is yielded. This suppresses the turbulence at the interface between the non-magnetic layer and the magnetic layer, thus preventing deterioration of the electromagnetic conversion property. Furthermore, since the average major axis length of the non-magnetic needle body is in the range from 0.25 to 1.0 $\mu$m, the reinforcement effect of the needle bodies can realize high strength for the magnetic recording medium. Furthermore, since the minor axis length of the non-magnetic needle body is 0.015 $\mu$m or less, the needle bodies are generally not oriented in the direction perpendicular to the film, thus improving the surface property of the magnetic recording medium. The minor axis length is 0.005 μm or more so as to prevent breakage of needle bodies, which may be caused by a technique for dispersing the non-magnetic needle bodies. Such a shape of the non-magnetic body makes it possible that the particles are dispersed in a paint satisfactorily and oriented in the in-plane direction of the coating film due to the shearing force during coating, thus improving the mechanical strength of the coating film and the smoothness of the surface. Furthermore, the improvement of the strength of the coating film enhances the head-touch property, thus improving the electromagnetic conversion property of the magnetic recording medium.

When the major axis length of the non-magnetic needle body is less than the above-mentioned range, the Young's modulus in the in-plane direction of the film tends to deteriorate. When the major axis length of the non-magnetic needle body is more than the above-mentioned range, the smoothness of the surface of the magnetic recording medium deteriorates. When the minor axis length is more than the above-mentioned range, the particles are oriented also in the direction perpendicular to the film, thus deteriorating the smoothness of the surface of the medium.

Furthermore, the glass transition temperatures ($Tg_1$, $Tg_2$) of the binding resins of the layers are in the respective ranges as described above, and the two glass transition temperatures have the relationship as described above, so that the magnetic recording medium has a satisfactory calender property and excellent strength.

When each binding resin comprises at least two resins, the glass transition temperatures ($Tg_1$, $Tg_2$) are calculated based on the weight harmonic average of the glass transition temperatures (absolute temperatures) of the resins.

Furthermore, since the content of the binding resin in the non-magnetic layer is in the range from 15 to 30 wt % with respect to the non-magnetic needle bodies, the needle bodies and the resin are mixed sufficiently without local aggregation, thus improving the strength of the non-magnetic layer and the roughness of the surface.

Furthermore, since fatty acid ester is added to the non-magnetic layer, the flexibility of the binding resin is enhanced so that the adverse effect on the film caused when the tape contacts the head can be reduced. Thus, the still frame lifetime can be improved. The magnetic recording medium of the present invention has characteristics not only in the Young's modulus in the forward direction for the head, but also in ensuring a satisfactory still frame lifetime. The amount of the fatty acid ester is 15 wt % or less with respect to the binding resin, for the purpose of preventing deterioration of the adhesiveness between the non-magnetic film and the non-magnetic layer, which leads to deterioration of the still frame lifetime. The amount of the fatty acid ester is 2 wt % or more for the purpose of optimizing the effect of the fatty acid ester on the still frame lifetime.

In the magnetic recording medium of the present invention, the magnetic layer has a thickness of 0.5 μm or less when dried. This is preferable in view of reduction of the self-demagnetizing function.

These and other advantages of the present invention will become apparent to those skilled in the art upon reading and understanding the following detailed description.

DESCRIPTION OF THE PREFERRED EMBODIMENTS

In the magnetic recording medium of the present invention, the Young's modulus at least in the forward direction for the head is preferably 690 kgf/mm² or more so as to ensure a sufficient strength in that direction. Furthermore, the surface roughness (Ra) of the magnetic layer is preferably 0.5 nm or less. This is because a low surface roughness maintains a satisfactory electromagnetic conversion property. Herein, the surface roughness (Ra) refers to a centerline average surface roughness (Ra) in a 50×50 μm area measured by the MIRAU method.

In the magnetic recording medium of the present invention, a first binding resin included in the non-magnetic layer is preferably at least one resin selected from the group consisting of polyvinyl chloride resin, acrylic resin, cellulose resin, polyurethane resin, polyester resin and polyether resin. Optionally, a polar group can be introduced into these resins.

In the magnetic recording medium of the present invention, the fatty acid ester is preferably an ester compound comprising fatty acid having 10 to 24 carbon atoms and alcohol having 2 to 12 carbon atoms. This fatty acid ester is suitable because it provides the binding resin with flexibility and improves the still frame lifetime of the magnetic recording medium.

In the magnetic recording medium of the present invention, more specifically, the non-magnetic needle bodies are preferably needle goethite particles. The needle goethite particles comprise iron hydroxide and have a larger needle ratio (major axis length/minor axis length) and a larger specific surface area than iron oxide. Moreover, the needle goethite particles are inexpensively available.

In the magnetic recording medium of the present invention, the non-magnetic layer preferably comprises 1 to 30 wt % of carbon black with respect to the non-magnetic needle bodies. Carbon black exerts an antistatic effect for the magnetic layer. When the content of the carbon black exceeds the above-mentioned range, the filling density of the non-magnetic needle bodies in the non-magnetic layer is reduced, thereby reducing the mechanical strength of the magnetic recording medium.

In the magnetic recording medium of the present invention, the average major axis length of the ferromagnetic powder is preferably in the range from 0.05 to 0.2 μm. When such ferromagnetic powder is used, the thickness of the coating film becomes uniform and the surface becomes smooth even if the thickness of the magnetic layer is 0.5 μm or less when dried.

The magnetic recording medium of the present invention preferably as a format of a relative rate of movement with respect to the head of 8 m/s or more. In this format, the characteristics can be exerted sufficiently.

Hereinafter, the materials contained in the magnetic recording medium of the present invention will be described.

Examples of the non-magnetic film for supporting each layer include polyesters such as polyethylene terephthalate and polyethylene-2,6-naphthalate; polyolefins such as polyethylene and polypropylene; cellulose derivatives such as cellulose triacetate, cellulose diacetate, cellulose acetate butyrate and cellulose acetate propionate; polyvinyl chloride resins such as polyvinyl chloride and polyvinylidene chloride; and plastics such as polycarbonate, polyimide and polyamide imide. Furthermore, non-magnetic metals such as aluminum, copper, tin, zinc or a non-magnetic alloy comprising these metals; glass or other various ceramics; paper or paper coated or laminated with α-polyolefin having about 2 to 10 carbon atoms such as polyethylene, polypropylene and ethylene-butene copolymer can be used in accordance with the desired end use. The thickness of the non-magnetic film is preferably about 1 to 10 μm, more preferably 4 to 8 μm. Furthermore, the centerline average surface roughness (Ra) in an area of 50×50 mm is preferably 25 nm or less, more preferably 20 nm or less.

Examples of the binding resin (binder) contained in the non-magnetic layer include a thermoplastic resin, a thermosetting resin, a reactive resin or a mixture thereof.

Specific examples of these resins include a polyvinyl chloride copolymer (Examples of a monomer for copolymerization are fatty acid vinyl ester such as vinyl acetate and vinyl propionate, alkyl acrylate such as ethyl acrylate, methyl acrylate, propyl acrylate, lauryl acrylate, stearyl acrylate, methyl methacrylate and ethyl methacrylate. Furthermore, vinyl alcohol, hydroxyethyl (meth)acrylate (hydroxyethyl methacrylate and hydroxyethyl acrylate), hydroxypropyl (meth)acrylate, hydroxybutyl (meth)acrylate, hydroxylauryl (meth)acrylate, hydroxystearyl (meth)acrylate, polyethylene glycol (meth)acrylate, polypropylene glycol (meth)acrylate, hydroxyethyl allyl ether, hydroxypropyl allyl ether, hydroxybutyl allyl ether, which contain hydroxyl group, are preferable because they improves the dynamic strength by combining with a polyisocyanate compound or an epoxy compound. As other monomers for polymerization, maleic acid, (meth)acrylic acid, acrylonitrile, ethylene or styrene can be added, if necessary). Other specific examples of the resins include acrylic resin typified by polymethyl methacrylate (examples of a monomer for copolymerization are the same as those for the polyvinyl chloride copolymer described above); cellulose resin such as cellulose nitrate, cellulose acetate propionate and cellulose acetate butyrate; polyvinyl acetal resin, polyvinyl butyral resin, epoxy resin, phenoxy resin, polyester polyurethane resin, polyether polyurethane resin, polyether ester polyurethane resin, polycarbonate polyurethane resin, polyester resin, polyether resin, and various synthetic rubber resins. Among these, polyvinyl chloride resin, acrylic resin, cellulose resin, polyurethane resin, polyester resin and polyether resin are preferable, as described above. The resins can be used in combinations of two or more.

It is preferable to introduce polar groups into molecules of the binding resin in order to improve the dispersibility of the non-magnetic body and the durability of the non-magnetic layer after drying. Examples of the polar group include —COOM, —SOBM, —SO$_4$M, —PO$_3$M$_2$, —OPO$_2$M$_2$, an amino group, an ammonium salt group, a —OH group, a —SH group and an epoxy group. Herein, M represents hydrogen, an alkali metal or ammonium. When one group comprises a plurality of Ms, the Ms can be the same or different.

A preferable example of the fatty acid ester is a ester compound comprising a fatty acid having 10 to 24 carbon atoms and alcohol having 2 to 12 carbon atoms. The fatty acid can be a saturated fatty acid or an unsaturated fatty acid. Any alcohol with 1 to 6 valences can be used.

Examples of such a fatty acid ester include butyl stearate, octyl stearate, amyl stearate, isooctyl stearate, octyl myristate, butoxyethyl stearate and butoxyethoxyethyl stearate.

The carbon black is not particularly limited, and any known carbon black that is generally used as non-magnetic powder in this type of non-magnetic coating can be used. The average particle diameter of primary particles of the carbon black is preferably in the range from 0.015 to 0.06 μm, more preferably 0.02 to 0.03 μm. The specific surface area is preferably 20 to 300 m$^2$/g. The DBP oil absorption amount is preferably 25 to 300 ml/100 g, more preferably 150 to 250 ml/100 g. As to carbon black that can be used, "Carbon Black Guidebook" (edited by Institute of Carbon Black) can be referred to.

Specific examples of the carbon black include SAF (Super Ablation Furnace), ISAF (Intermediate SAF), HAF (High Ablation Furnace), FF (Fine Furnace), FEF (Fast Extruding Furnace), GPE (General Purpose Furnace), FT (Fine Thermal), SRF (Semi Reinforcing Furnace) and HCC (High Color Furnace).

In addition, other substances having a moistening effect, an antistatic effect, a dispersing effect, or a plasticizing effect that are conventionally used for a coating type magnetic recording medium can be mixed for the non-magnetic coating, if necessary. These substances include a substance that dissolves in the paint (e.g., a surfactant or fatty acid) and a substance that is dispersed in the paint while maintaining the form of particles (e.g., metal oxide, metal nitride or metal sulfide).

Examples of the organic solvent for the non-magnetic paint, which is a material of the non-magnetic layer, include ketones such as acetone, methylethyl ketone, methylisobutyl ketone and cyclohexane, esters such as methyl acetate, ethyl acetate, butyl acetate, ethyl lactate, glycol monoethylether acetate, glycol ethers such as ether, glycoldimethylether, glycolmonoethylether and dioxane, tars (aromatic hydrocarbon) such as benzene, toluene and xylene, methylene chloride, ethylene chloride, carbon tetrachloride, chloroform, ethylene chlorohydrin, and dichlorobenzene. These solvents can be used in combinations of two or more.

The non-magnetic paint can be produced basically by a method comprising a mixing step of stirring the above-mentioned various materials in a high shearing state and a dispersing step of homogenizing the diluted mixture. For mixing, any known mixing apparatus such as a planetary mixer, a double planetary mixer, a chemical mixer, a kneader, a banbury mixer, a monoaxial screw extruder and a biaxial screw kneader can be used. For dispersing, any known dispersing apparatus such as a bead mill and a ball mill can be used.

As the ferromagnetic powder contained in the magnetic layer, ferromagnetic iron oxide, ferromagnetic chromium dioxide or ferromagnetic alloy powder can be used. Specific examples of the ferromagnetic iron oxide are ferromagnetic iron oxides having a value of x satisfying $1.33 \leq x \leq 1.50$ when the ferromagnetic iron oxide is represented by the general formula FeO$_x$, i.e., maghemite (γ-Fe$_2$O$_3$, x=1.50), magnetite (Fe$_3$O$_4$, x=1.33) and berthollide compounds thereof (FeOx, 1.33<x<1.50). Abivalent metal can be added to these ferromagnetic iron oxides. Examples of the bivalent metal include Cr, Mn, Co, Ni, Cu and Zu. It is preferable to add the bivalent metal in an amount of 0 to 10 atom % to the iron oxide. Examples of the ferromagnetic chromium dioxide include CrO$_2$ and CrO$_2$ added with 0 to 20 wt % of oxide of a metal such as Na, K, Ti, V, Mn, Fe, Co, Ni, Tc, Ru, Sn, Ce or Pb. The ferromagnetic alloy powder comprises at least 75 wt % of metal. The metal comprises 80 wt % or more of at least one ferromagnetic metal (e.g., Fe, Co, Ni, Fe—Co, Fe—Ni), and 20 wt % or less, preferably 0.5 to 5 wt % of a composition of Al, Si, S, Sc, Ti, V, Cr, Mn, Cu, Zn, Y, Mo, Rh, Pd, Ag, Sn, Sb, Te, Ba, Ta, W, Re, Au, Hy, Pb, Bi, La, Ce, Pr, Nd, B or P. The ferromagnetic alloy powder may comprise a small amount of absorbed water, hydroxide or oxide as a non-metal composition. Among these ferromagnetic powder, the ferromagnetic alloy powder can be used preferably.

The needle ratio (major axis length/minor axis length) of the ferromagnetic powder is preferably 5 or more, more preferably 5 to 20. Such a needle ratio provides a better orientation property in the magnetic layer and makes it possible to improve the surface property and squareness ratio of the magnetic layer. Furthermore, the coercive force (Hc) of the ferromagnetic powder is preferably 1600 to 2800 Oe, more preferably 2000 to 2800 Oe. The saturation magnetization amount (σs) of the ferromagnetic powder is preferably 120 to 180 emu/g.

As for the binding resin and the organic solvent for the magnetic coating, the same substances as the examples for the non-magnetic coating can be used. However, a binding resin is selected so that the glass transition temperature ($Tg_2$) of the binding resin contained in the magnetic coating and the glass transition temperature ($Tg_1$) of the binding resin contained in the non-magnetic coating satisfy the relationship described above. The introduction of a polar group into the binding resin contained in the magnetic layer is effective for improving the dispersibility of the ferromagnetic powder and the durability of the magnetic layer after dried. Furthermore, as in the case of the non-magnetic coating, various substances having a moistening effect, an antistatic effect, a dispersing effect, a plasticizing effect, an antirust effect or a polishing effect can be mixed. These substances include a substance that dissolves in the paint (e.g., a surfactant, fatty acid and fatty acid ester) and a substance that is dispersed in the paint while maintaining the form of particles (e.g., metal oxide, metal nitride or metal sulfide).

The magnetic paint can be produced basically by a method comprising a mixing step and a dispersing step, as with the non-magnetic coating.

The weight average molecular weights of the binding resin contained in the non-magnetic coating and the binding resin contained in the magnetic coating are both preferably 5000 to 100000, more preferably 15000 to 50000.

The binding resin is contained in the magnetic coating preferably in an amount of 10 to 20 wt % with respect to the ferromagnetic powder. The amount in this range lets the ferromagnetic powder disperse satisfactorily, thus further improving the smoothness of the surface of the magnetic layer. Moreover, floating of the resin on the surface of the magnetic layer can be reduced, thus improving the electromagnetic conversion property and the tape travel stability.

The content of the entire filler including the ferromagnetic powder in the magnetic layer is preferably 70 to 90 wt % for the following reasons. When the content of the filler in the magnetic layer is smaller than the above-mentioned range, the ferromagnetic powder is present in a smaller proportion, so that the electromagnetic conversion property deteriorates. When the content is larger than the above-mentioned range, the resin is not sufficient to disperse the ferromagnetic powder, thus deteriorating the dispersibility and the dispersion stability, leading to degradation of the electromagnetic conversion property.

The content of the entire non-magnetic powder in the finally obtained non-magnetic layer is preferably 60 to 80 wt % for the following reasons. When the content of the non-magnetic powder, which is the filler, in the non-magnetic layer is smaller than the above-mentioned range, the mechanical strength of the lower non-magnetic layer deteriorates, thus degrading the still frame lifetime. When the content is larger than the above-mentioned range, the adhesiveness between the lower non-magnetic layer and the non-magnetic film becomes weak, so that the film is peeled easily.

In the present invention, the non-magnetic film serving as a support is coated with the non-magnetic paint so as to form a coating film. Then, the coating film is coated with the magnetic paint so as to form another coating film. For the formation of the coating films, any known method can be used. Examples of the coating method include air doctor coating, blade coating, air knife coating, squeeze coating, impregnation coating, reverse roll coating, transfer roll coating, gravure coating and die coating.

After the formation of the coating films of the magnetic paints, the magnetic field is oriented, the coating films are dried and a calender treatment is performed, so that a final magnetic recording medium can be obtained. The calender treatment is performed preferably by the super calender method in which the multilayer film passes between two rolls, for example, a metal roll and a cotton roll or synthetic resin roll, two metal rolls or two synthetic resin rolls. As the resin for the synthetic resin roll, epoxy, polyamide or polyimide heat resistant resin can be used. The super calender method is preferably performed at a pressure between two rolls of about 300 to 600 kg/cm$^2$, a temperature of about 50 to 100° C. and a treatment rate of 30 to 120 m/min.

In the magnetic recording medium of the present invention, it is preferable to form a back coating layer on the surface other than the surface provided with the non-magnetic layer and the magnetic layer.

EXAMPLES

Hereinafter, the present invention will be more specifically described by way of examples and comparative examples. However, the present invention is not limited thereto.

Example 1

Preparation of Paint for Magnetic Layer

Magnetic powder:

ferromagnetic metal powder 100 parts by weight (specific surface area (BET method) 50 m$^2$/g) (σs 140 emu/g) (Hc 2200 Oe)

Organic binding resin: polyvinyl chloride resin (Tg=70° C.) 8 parts by weight

Organic binding resin: polyurethane resin (Tg=30° C.) 8 parts by weight

The glass transition temperature ($Tg_2$) of the entire binding resin is 50° C. (calculated based on the weight harmonic average, which holds true for the glass transition temperature described later).

| | |
|---|---|
| Fine particle polishing agent (α-Al$_2$O$_3$, average particle diameter: 0.2 μm) | 10 parts by weight |
| Carbon black (average particle diameter: 0.015 μm) | 2 parts by weight |
| Methyl ethyl ketone (MEK) | 12 parts by weight |
| Toluene | 12 parts by weight |
| Cyclohexanone | 4 parts by weight |

The above-listed materials were kneaded by a biaxial continuous kneader sufficiently. A material having the following composition was further added to the obtained kneaded mixture, and diluted by a dissolver. Then, dispersion was performed by a sand mill so as to obtain a magnetic paint.

| | |
|---|---|
| Kneaded mixture | 156 parts by weight |
| MEK | 93 parts by weight |

-continued

| | |
|---|---|
| Toluene | 93 parts by weight |
| Cyclohexanone | 31 parts by weight |

The following materials were further added throughout the obtained magnetic paint in the following composition, and the mixture was stirred by a dissolver.

| | |
|---|---|
| Stearic acid | 1 part by weight |
| Butoxyethoxyethyl stearate | 2 parts by weight |
| Polyisocyanate | 6 parts by weight |

Preparation of Paint for Lower Non-magnetic Layer

| | |
|---|---|
| Non-magnetic filler: needle goethite particles (average major axis length: 0.25 μm, average minor axis length: 0.01 μm) | 100 parts by weight |
| Carbon black (primary particle diameter: 0.02 μm, specific surface area: 220m²/g) | 5 parts by weight |
| Organic binding resin: polyvinyl chloride resin (Tg = 70° C.) | 11 parts by weight |
| Organic binding resin: polyurethane resin (Tg = 5° C.) | 9 parts by weight |

The glass transition temperature ($Tg_1$) of the entire binding resin is 40° C.

| | |
|---|---|
| MEK | 15 parts by weight |
| Toluene | 15 parts by weight |
| Cyclohexanone | 5 parts by weight |

The above-listed materials were kneaded by a pressurized kneader sufficiently. The following materials were further added to the obtained kneaded mixture in the following composition, and the mixture was diluted by a dissolver. Then, dispersion was performed by a sand mill so as to obtain a paint for a lower non-magnetic layer.

| | |
|---|---|
| Kneaded mixture | 160 parts by weight |
| MEK | 123 parts by weight |
| Toluene | 123 parts by weight |
| Cyclohexanone | 41 parts by weight |

The following materials were further added throughout the obtained non-magnetic paint in the following composition, and the mixture was stirred by a dissolver.

| | |
|---|---|
| Stearic acid | 1 part by weight |
| Butoxyethoxyethyl stearate (12% by weight with respect to the binding resin) | 2.4 parts by weight |
| Polyisocyanate | 6 parts by weight |

A lower non-magnetic layer was formed in a thickness of 2 μm when dried on the entire surface of a polyethylene terephthalate (PET) film with a thickness of 6 μm (surface roughness: centerline average roughness Ra=3 nm, Young's modulus in the coating direction: 560 kgf/mm²). Then, the lower non-magnetic layer was coated with the magnetic paint so that the thickness of the coating film became 0.2 μm when dried. Then, orientation treatment was performed so as to match the magnetization easy axis to the forward direction of the film. Subsequently, a calender treatment (temperature: 90° C., rate: 80 m/min) and a thermosetting treatment were performed.

Preparation of Back-coating Paint

| | |
|---|---|
| Carbon black (primary particle diameter: 0.02 μm, specific surface area: 220 m²/g) | 100 parts by weight |
| MEK | 100 parts by weight |
| Cyclohexanone | 50 parts by weight |

The above-listed materials were moistened by a ball mill. The following materials were further added to the obtained mixture in the following composition, and the mixture was diluted by a dissolver. Then, dispersion was performed by a sand mill so as to obtain a paint for back-coating.

| | |
|---|---|
| Mixture | 250 parts by weight |
| Nitrocellulose resin (Tg = 100° C.) | 40 parts by weight |
| Polyurethane resin (Tg = 30° C.) | 40 parts by weight |
| MEK | 50 parts by weight |
| Toluene | 50 parts by weight |

The following materials were further added throughout the obtained paint for back-coating in the following composition, and the mixture was stirred by a dissolver so as to obtain a paint for back-coating.

| | |
|---|---|
| Stearic acid | 2 part by weight |
| Polyisocyanate | 15 parts by weight |

The surface other than the surface coated with the lower non-magnetic layer and the upper magnetic layer was coated with the paint for back-coating so as to form a film having a thickness of 0.5 μm when dried. After drying, the film was cut into segments with a width of 6.35 mm. Thus, a magnetic tape in Example 1 was obtained.

Example 2

A magnetic tape was produced in the same manner as in Example 1, except that needle goethite particles having an average major axis length of 1.0 μm and an average minor axis length of 0.01 μm were used for the lower non-magnetic layer.

Example 3

A magnetic tape was produced in the same manner as in Example 1, except that needle goethite particles having an average major axis length of 0.31 μm and an average minor axis length of 0.01 μm were used for the lower non-magnetic layer.

Example 4

A magnetic tape was produced in the same manner as in Example 1, except that needle goethite particles having an average major axis length of 0.3 μm and an average minor axis length of 0.015 μm were used for the lower non-magnetic layer.

Example 5

A magnetic tape was produced in the same manner as in Example 1, except that the binding resins were used in the following amounts for the lower non-magnetic layer.

| polyvinyl chloride resin (Tg = 70° C.) | 8 parts by weight |
| polyurethane resin (Tg = 5° C.) | 12 parts by weight |

The glass transition temperature ($Tg_1$) of the entire binding resin is 30° C.

Example 6

A magnetic tape was produced in the same manner as in Example 1, except that the binding resins were used in the following amounts for the upper magnetic layer and the lower non-magnetic layer.

Upper Magnetic Layer

| polyvinyl chloride resin (Tg = 70° C.) | 10 parts by weight |
| polyurethane resin (Tg = 30° C.) | 6 parts by weight |

The glass transition temperature ($Tg_2$) of the entire binding resin is 55° C.

Lower Non-magnetic Layer

| polyvinyl chloride resin (Tg = 70° C.) | 14 parts by weight |
| polyurethane resin (Tg = 5° C.) | 6 parts by weight |

The glass transition temperature ($Tg_1$) of the entire binding resin is 50° C.

Example 7

A magnetic tape was produced in the same manner as in Example 1, except that the binding resins were used in the following amounts for the upper magnetic layer and the lower non-magnetic layer.

Upper Magnetic Layer

| polyvinyl chloride resin (Tg = 70° C.) | 4 parts by weight |
| polyurethane resin (Tg = 30° C.) | 12 parts by weight |

The glass transition temperature ($Tg_2$) of the entire binding resin is 40° C.

Lower Non-magnetic Layer

| polyvinyl chloride resin (Tg = 70° C.) | 8 parts by weight |
| polyurethane resin (Tg = 5° C.) | 12 parts by weight |

The glass transition temperature ($Tg_1$) of the entire binding resin is 35° C.

Example 8

A magnetic tape was produced in the same manner as in Example 1, except that the binding resins were used in the following amounts for the upper magnetic layer.

Upper Magnetic Layer

| polyvinyl chloride resin (Tg = 70° C.) | 8 parts by weight |
| polyurethane resin (Tg = 70° C.) | 8 parts by weight |

The glass transition temperature ($Tg_2$) of the entire binding resin is 70° C.

Example 9

A magnetic tape was produced in the same manner as in Example 1, except that the lower non-magnetic comprises no carbon black.

Example 10

A magnetic tape was produced in the same manner as in Example 1, except that the lower non-magnetic layer comprises 30 parts by weight of carbon black on the basis of 100 parts by weight of the needle goethite particles.

Example 11

A magnetic tape was produced in the same manner as in Example 1, except that the lower non-magnetic layer comprises 0.4 parts by weight (2 wt % with respect to the amount of the binding resin) of butoxyethoxyethyl stearate on the basis of 100 parts by weight of the needle goethite particles.

Example 12

A magnetic tape was produced in the same manner as in Example 1, except that the lower non-magnetic layer comprises 3 parts by weight (15 wt % with respect to the amount of the binding resin) of butoxyethoxyethyl stearate on the basis of 100 parts by weight of the needle goethite particles.

Example 13

A magnetic tape was produced in the same manner as in Example 1, except that the lower non-magnetic layer comprises 15 parts by weight of the binding resin on the basis of 100 parts by weight of the needle goethite particles.

Example 14

A magnetic tape was produced in the same manner as in Example 1, except that the lower non-magnetic layer comprises 30 parts by weight of the binding resin on the basis of 100 parts by weight of the needle goethite particles.

Comparative Example 1

A magnetic tape was produced in the same manner as in Example 1, except that needle goethite particles having an average major axis length of 0.2 μm and an average minor axis length of 0.01 μm were used for the lower non-magnetic layer.

Comparative Example 2

A magnetic tape was produced in the same manner as in Example 1, except that needle goethite particles having an average major axis length of 1.5 μm and an average minor axis length of 0.01 μm were used for the lower non-magnetic layer.

Comparative Example 3

A magnetic tape was produced in the same manner as in Example 1, except that needle goethite particles having an average major axis length of 0.3 μm and an average minor axis length of 0.02 μm were used for the lower non-magnetic layer.

Comparative Example 4

A magnetic tape was produced in the same manner as in Example 1, except that the binding resins were used in the following amounts for the lower non-magnetic layer.

| polyvinyl chloride resin (Tg = 70° C.) | 5 parts by weight |
| polyurethane resin (Tg = 5° C.) | 15 parts by weight |

The glass transition temperature ($Tg_1$) of the entire binding resin is 20° C.

Comparative Example 5

A magnetic tape was produced in the same manner as in Example 1, except that the binding resins were used in the following amounts for the lower non-magnetic layer.

| polyvinyl chloride resin (Tg = 70° C.) | 17 parts by weight |
| polyurethane resin (Tg = 5° C.) | 3 parts by weight |

The glass transition temperature ($Tg_1$) of the entire binding resin is 60° C.

Comparative Example 6

A magnetic tape was produced in the same manner as in Example 1, except that the binding resins were used in the following amounts for the upper magnetic layer.
Upper Magnetic Layer

| polyvinyl chloride resin (Tg = 70° C.) | 3 parts by weight |
| polyurethane resin (Tg = 5° C.) | 13 parts by weight |

The glass transition temperature ($Tg_2$) of the entire binding resin is 30° C.

Comparative Example 7

A magnetic tape was produced in the same manner as in Example 1, except that the binding resins were used in the following amounts for the upper magnetic layer.
Upper Magnetic Layer

| polyvinyl chloride resin (Tg = 90° C.) | 8 parts by weight |
| polyurethane resin (Tg = 70° C.) | 8 parts by weight |

The glass transition temperature ($Tg_2$) of the entire binding resin is 80° C.

Comparative Example 8

A magnetic tape was produced in the same manner as in Example 1, except that the lower non-magnetic layer comprises 35 parts by weight of carbon black on the basis of 100 parts by weight of the needle goethite particles.

Comparative Example 9

A magnetic tape was produced in the same manner as in Example 1, except that the lower non-magnetic layer comprises 0.2 parts by weight (1 wt % with respect to the amount of the binding resin) of butoxyethoxyethyl stearate on the basis of 100 parts by weight of the needle goethite particles.

Comparative Example 10

A magnetic tape was produced in the same manner as in Example 1, except that the lower non-magnetic layer comprises 4 parts by weight (20 wt % with respect to the amount of the binding resin) of butoxyethoxyethyl stearate on the basis of 100 parts by weight of the needle goethite particles.

Comparative Example 11

A magnetic tape was produced in the same manner as in Example 1, except that the lower non-magnetic layer comprises 35 parts by weight of the binding resin on the basis of 100 parts by weight of the needle goethite particles.

Comparative Example 12

A magnetic tape was produced in the same manner as in Example 1, except that the lower non-magnetic layer comprises 12 parts by weight of the binding resin on the basis of 100 parts by weight of the needle goethite particles.

The various magnetic tape samples obtained in the Examples and the Comparative Examples (refer to Table 1) were evaluated by performing the following tests. Table 2 shows the results.
(1) Measurement of Surface Roughness A centerline average surface roughness (Ra) was measured in an area of 50×50 μm with TOPO3D manufactured by WYKO Co. Ltd. by the MIRAU method.
(2) Measurement of Electromagnetic Conversion Property Output (recording / reproducing wavelength: 0.48 μm) of the produced magnetic tapes was measured by a DVC-Pro video tape recorder (AJ-D750 manufactured by Matsushita Electric Industrial Co. Ltd.). Table 1 shows relative values with respect to the output of Example 1, which is set as 0dB.
(3) Measurement of Still Frame Lifetime Still frame lifetime was evaluated in the following manner. Recording is performed at a recording wavelength of 0.48 μm by a DVC-Pro video tape recorder (AJ-D750 manufactured by Matsushita Electric Industrial Co. Ltd.) from which a still frame release function (pause release function) was removed. Then, a period of time until detected output in pause mode is reduced by 6 dB from the initial value was measured. The measurement was performed at a temperature of 25° C. and a humidity of 40%.
(4) Measurement of Young's Modulus The tape was stretched in the longitudinal direction (forward direction), and a change in stress was measured, and the Young's modulus was calculated based on the gradient in an elastic area.

TABLE 1

| | Lower goethite particles | | Binding resin | | Lower binding resin amount | Carbon amount | Butoxy-ethoxyethyl stearate |
| | major axis (μm) | minor axis (μm) | $Tg_1$ (° C.) | $Tg_2$ (° C.) | (to particles: wt %) | (to particles: wt %) | (to resin: wt %) |
| --- | --- | --- | --- | --- | --- | --- | --- |
| Ex 1. | 0.25 | 0.01 | 40.0 | 50.0 | 20 | 5 | 12 |
| Ex. 2 | 1.0 | 0.01 | 40.0 | 50.0 | 20 | 5 | 12 |
| Ex. 3 | 0.3 | 0.005 | 40.0 | 50.0 | 20 | 5 | 12 |

TABLE 1-continued

|  | Lower goethite particles | | Binding resin | | Lower binding resin amount (to particles: wt %) | Carbon amount (to particles: wt %) | Butoxy-ethoxy-ethyl stearate (to resin: wt %) |
|---|---|---|---|---|---|---|---|
|  | major axis (μm) | minor axis (μm) | Tg$_1$ (° C.) | Tg$_2$ (° C.) | | | |
| Ex. 4 | 0.3 | 0.015 | 40.0 | 50.0 | 20 | 5 | 12 |
| Ex. 5 | 0.3 | 0.01 | 30.0 | 50.0 | 20 | 5 | 12 |
| Ex. 6 | 0.3 | 0.01 | 50.0 | 55.0 | 20 | 5 | 12 |
| Ex. 7 | 0.3 | 0.01 | 35.0 | 40.0 | 20 | 5 | 12 |
| Ex. 8 | 0.3 | 0.01 | 40.0 | 70.0 | 20 | 5 | 12 |
| Ex. 9 | 0.3 | 0.01 | 40.0 | 50.0 | 20 | 0 | 12 |
| Ex. 10 | 0.3 | 0.01 | 40.0 | 50.0 | 20 | 30 | 12 |
| Ex. 11 | 0.3 | 0.01 | 40.0 | 50.0 | 20 | 5 | 2 |
| Ex. 12 | 0.3 | 0.01 | 40.0 | 50.0 | 20 | 5 | 15 |
| Ex. 13 | 0.3 | 0.01 | 40.0 | 50.0 | 15 | 5 | 12 |
| Ex. 14 | 0.3 | 0.01 | 40.0 | 50.0 | 30 | 5 | 12 |
| Com. Ex. 1 | 0.2 | 0.01 | 40.0 | 50.0 | 20 | 5 | 12 |
| Com. Ex. 2 | 1.5 | 0.01 | 40.0 | 50.0 | 20 | 5 | 12 |
| Com. Ex. 3 | 0.3 | 0.02 | 40.0 | 50.0 | 20 | 5 | 12 |
| Com. Ex. 4 | 0.3 | 0.01 | 20.0 | 50.0 | 20 | 5 | 12 |
| Com. Ex. 5 | 0.3 | 0.01 | 60.0 | 50.0 | 20 | 5 | 12 |
| Com. Ex. 6 | 0.3 | 0.01 | 40.0 | 30.0 | 20 | 5 | 12 |
| Com. Ex. 7 | 0.3 | 0.01 | 40.0 | 80.0 | 20 | 5 | 12 |
| Com. Ex. 8 | 0.3 | 0.01 | 40.0 | 50.0 | 20 | 35 | 12 |
| Com. Ex. 9 | 0.3 | 0.01 | 40.0 | 50.0 | 20 | 5 | 1 |
| Com. Ex. 10 | 0.3 | 0.01 | 40.0 | 50.0 | 20 | 5 | 20 |
| Com. Ex. 11 | 0.3 | 0.01 | 40.0 | 50.0 | 12 | 5 | 12 |
| Com. Ex. 12 | 0.3 | 0.01 | 40.0 | 50.0 | 35 | 5 | 12 |

TABLE 2

|  | Surface roughness (nm) | Young's modulus (kgf/mm$^2$) | Still duration (min) | Output (dB) |
|---|---|---|---|---|
| Ex. 1 | 4.2 | 750 | 250 | 0 |
| Ex. 2 | 4.3 | 800 | 270 | −0.1 |
| Ex. 3 | 4.0 | 700 | 240 | +0.3 |
| Ex. 4 | 4.5 | 750 | 250 | −0.1 |
| Ex. 5 | 4.2 | 700 | 240 | 0 |
| Ex. 6 | 4.6 | 800 | 270 | −0.1 |
| Ex. 7 | 4.0 | 700 | 240 | +0.3 |
| Ex. 8 | 4.6 | 800 | 270 | −0.1 |
| Ex. 9 | 4.0 | 800 | 270 | 0 |
| Ex. 10 | 4.6 | 690 | 230 | −0.2 |
| Ex. 11 | 4.4 | 800 | 230 | −0.1 |
| Ex. 12 | 4.0 | 700 | 230 | +0.2 |
| Ex. 13 | 4.6 | 800 | 270 | −0.2 |
| Ex. 14 | 4.0 | 700 | 240 | +0.2 |
| Com. Ex. 1 | 4.0 | 350 | 20 | −0.1 |
| Com. Ex. 2 | 7.3 | 770 | 770 | −5.1 |
| Com. Ex. 3 | 7.3 | 450 | 30 | −5.2 |
| Com. Ex. 4 | 4.0 | 500 | 60 | −0.2 |
| Com. Ex. 5 | 6.9 | 860 | 360 | −4.9 |
| Com. Ex. 6 | 4.1 | 500 | 60 | −0.2 |
| Com. Ex. 7 | 7.0 | 870 | 270 | −5.3 |
| Com. Ex. 8 | 6.2 | 680 | 120 | −3.7 |
| Com. Ex. 9 | 5.8 | 750 | 50 | −3.5 |
| Com. Ex. 10 | 4.0 | 370 | 20 | −0.2 |
| Com. Ex. 11 | 8.2 | 520 | 50 | −5.9 |
| Com. Ex. 12 | 4.2 | 320 | 10 | −0.3 |

The results of Example 1 and Comparative Example 1 confirm that when the major axis length of the needle goethite particles in the lower non-magnetic layer is smaller than 0.25 μm, the still frame lifetime deteriorates. The reason is believed to be that since the major axis length of the needle goethite particles is smaller than 0.25 μm, the Young's modulus in the forward direction of the tape is reduced.

The results of Example 2 and Comparative Example 2 confirm that when the major axis length of the needle goethite particles in the lower non-magnetic layer is larger than 1.0 μm, the surface roughness deteriorates, thus reducing the output.

The results of Example 4 and Comparative Example 3 confirm that when the minor axis length of the needle goethite particles in the lower non-magnetic layer is larger than 0.015 μm, the surface property of the surface of the coating film deteriorates, thus reducing the output.

The results of Example 5 and Comparative Example 4 confirm that when the glass transition temperature of the binding resin in the lower non-magnetic layer is lower than 30° C., the Young's modulus in the forward direction of the tape is reduced, thus reducing the still frame lifetime.

The results of Example 6 and Comparative Example 5 confirm that when the glass transition temperature of the binding resin in the lower non-magnetic layer is higher than 50° C. and higher than the glass transition temperature of the binding resin in the upper magnetic layer, the calender property deteriorates, thus degrading the surface roughness and reducing the output.

The results of Example 7 and Comparative Example 6 confirm that when the glass transition temperature of the binding resin in the upper magnetic layer is lower than 40° C., the Young's modulus in the forward direction of the tape is reduced, thus reducing the still frame lifetime.

The results of Example 8 and Comparative Example 7 confirm that when the glass transition temperature of the binding resin in the upper magnetic layer is higher than 70° C., the calender property deteriorates, thus degrading the surface roughness and reducing the output.

The results of Examples 9 and 10 and Comparative Example 8 confirm that when the amount of the carbon black in the lower non-magnetic layer is larger than 30 parts by weight on the basis of 100 parts by weight of the needle goethite particles, the filling property and the dispersibility of the needle goethite particles deteriorate so that both the Young's modulus and the surface property of the tape deteriorate. As a result, the still frame lifetime and the output of the tape also deteriorate.

The results of Example 11 and Comparative Example 9 confirm that when the content of butoxyethoxyethyl stearate in the lower non-magnetic layer is smaller than 2 wt % with respect to the binding resin, the still frame lifetime is reduced. The reason is believed to be that the flexibility of the coating film is not sufficient so that it is difficult to reduce the impact caused by the contact between the tape and the head.

The results of Example 12 and Comparative Example 10 confirm that when the content of butoxyethoxyethyl stearate in the lower non-magnetic layer is larger than 15 wt % with respect to the binding resin, the still frame lifetime is reduced. The reason is believed to be that the adhesiveness between the lower non-magnetic layer and the non-magnetic support deteriorates.

The results of Examples 13 and 14 and Comparative Examples 11 and 12 confirm that when the content of the binding resin in the lower non-magnetic layer is smaller than 15 parts by weight and larger than 30 parts by weight on the basis of 100 parts by weight of the needle goethite particles, both the still frame lifetime and the output deteriorate. The reason is believed to be that when the content of the binding resin is less than 15 parts by weight, the resin is not sufficient in the amount so as to disperse the needle goethite particles, thus resulting in inhomogeneous dispersion. Furthermore, it is believed that a resin amount of more than 30 parts by weight reduces the Young's modulus, thus reducing the still frame lifetime.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A magnetic recording medium comprising:
   a non-magnetic film;
   a non-magnetic layer, a surface of the non-magnetic film being coated with the non-magnetic layer; and
   a magnetic layer having a thickness of 0.51 μm or less when dried, the non-magnetic layer being coated with the magnetic layer,
   wherein the non-magnetic layer comprises:
      a non-magnetic needle body having an average major axis length of 0.25 to 1.0 μm and an average minor axis length of 0.005 to 0.015 μm;
      a first binding resin having a glass transition temperature ($Tg_1$) of 30 to 50° C., the content of the first binding resin being 15 to 30 wt % with respect to the non-magnetic needle body; and
      fatty acid ester, the content of the fatty acid ester being 2 to 15 wt % with respect to the first binding resin,
   the magnetic layer comprises ferromagnetic powder and a second binding resin having a glass transition temperature ($Tg_2$) of 40 to 70° C., and
   the glass transition temperature ($Tg_1$) of the first binding resin is at least 5° C. lower than the glass transition temperature ($Tg_2$) of the second binding resin, and the entire thickness of the layers and the film is 12 μm or less.

2. The magnetic recording medium according to claim 1, wherein the recording medium has a Young's modulus at least in a forward direction for a head of 690 kgf/mm² or more.

3. The magnetic recording medium according to claim 1, wherein a surface roughness (Ra) of a surface of the magnetic layer is 5.0 Onm or less.

4. The magnetic recording medium according to claim 1, wherein the first binding resin is at least one resin selected from the group consisting of polyvinyl chloride resin, acrylic resin, cellulose resin, polyurethane resin, polyester resin and polyether resin.

5. The magnetic recording medium according to claim 1, wherein the fatty acid ester is an ester compound comprising fatty acid having 10 to 24 carbon atoms and alcohol having 2 to 12 carbon atoms.

6. The magnetic recording medium according to claim 1, wherein the non-magnetic needle body is needle goethite particles.

7. The magnetic recording medium according to claim 1, wherein the non-magnetic layer comprises 1 to 30 wt % of carbon black with respect to the non-magnetic needle body.

8. The magnetic recording medium according to claim 1, wherein the average major axis length of the ferromagnetic powder is in a range from 0.05 to 0.21 μm.

9. The magnetic recording medium according to claim 1 having a format of a relative rate of movement with respect to a magnetic head of 8 m/s or more.

* * * * *